Figure 1A:
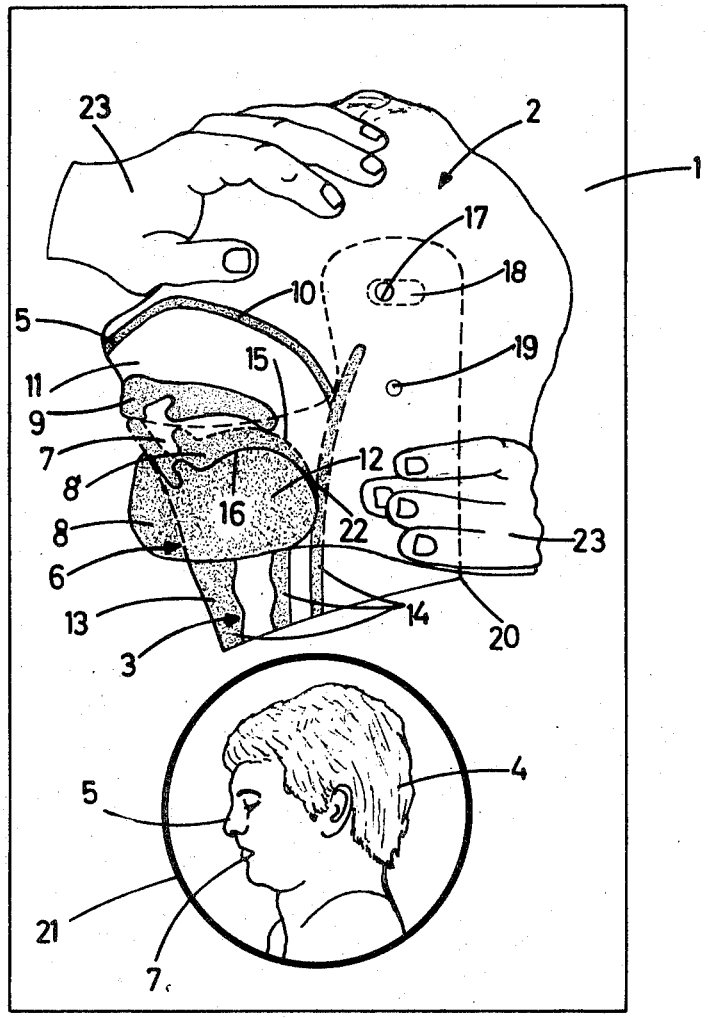

United States Patent [19]

Laerdal

[11] 3,859,737
[45] Jan. 14, 1975

[54] DEVICE FOR USE IN TEACHING FIRST AID
[76] Inventor: Asmund S. Laerdal, Stavanger, Norway
[22] Filed: Jan. 22, 1973
[21] Appl. No.: 325,744

[30] Foreign Application Priority Data
July 12, 1972  Germany.............................. 25917

[52] U.S. Cl. ................................................ 35/17
[51] Int. Cl. ........................................... G09b 23/32
[58] Field of Search ....................................... 35/17

[56] References Cited
UNITED STATES PATENTS
2,304,344  12/1942  Dignowity............................. 35/17
2,507,768  5/1950   Champagne...................... 35/17 X
3,009,266  11/1961  Brook .................................... 35/17
3,178,833  4/1965   Gulbransen........................... 35/17
3,471,962  10/1969  Klein................................. 35/28 X Primary Examiner—Harland S. Skogquist

[57]  ABSTRACT

A device for use in teaching first aid comprises a panel with a plurality of elements thereon which are shaped in accordance with the outline of parts of the human body. Some of the elements are movable in the manner in which the parts of the body they represent are moved during first aid. The elements are suitably planar, some may overlap and movable elements may be coupled. The elements can be movable parallel to the panel, but in another form they can be mounted to fold up from the panel.

2 Claims, 5 Drawing Figures

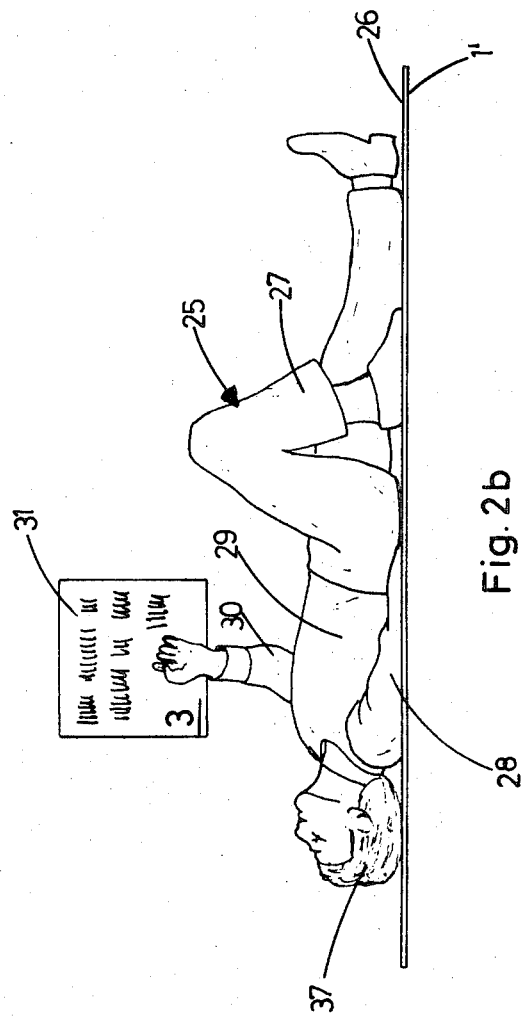

DEVICE FOR USE IN TEACHING FIRST AID

This invention relates to a device for use in teaching first aid.

In the past only two possibilities for instruction in first aid have been available apart from practicing on a live subject. Firstly there are a number of relatively complex three dimensional replicas of the human body or of parts thereof on which first aid measures can be practiced. Although these known devices or replicas permit realistic practicing of the necessary measures, they are comparatively costly and voluminous so that their use is restricted to a few occasions. More particularly, the trainee is not afforded the possibility of regular practice of the necessary measures. Secondly, instruction can be performed with the use of illustrations and descriptions and with the showing of films. In this way first aid measures can be theoretically explained in detail, but they cannot be actively practiced. It is, therefore, questionable whether persons who have been instructed in this way will be able correctly to perform first aid measures when necessary.

It is therefore the object of the invention to make available a device for teaching first aid measures which can be produced at comparatively low cost, does not occupy much space, and nevertheless provides the possibility of repeatedly practicing the necessary manipulations.

According to the present invention there is provided a device for use in teaching first aid including a plurality of elements shaped in accordance with the outline of parts of the human body and supported on a panel, at least one of the elements being movable with respect to the panel in like manner to the movement of the part of the human body which it represents during the application of first aid measures.

The elements are preferably planar, they may overlap, they may be parallel to and movable parallel to the panel and movable elements may be interconnected so that movement of one causes movement of another.

More particularly, the invention provides a device for use in teaching artificial respiration including a panel, a first planar element shaped in accordance with a side view of a human head except the lower lip, and marked to illustrate the tongue and pivotable on and parallel to the panel, a second planar element shaped in accordance with an associated neck and the lower lip and being marked to illustrate the wind pipe, and pivotable on and parallel to the panel, one said element at least partly overlying the other and being at least in part transparent, said elements being interconnected and relatively pivotable between a first position in which the mouth appears closed and the windpipe to be blocked by the tongue and a second position in which the mouth and windpipe appear open.

The invention in another particular aspect provides a device for use in teaching first aid including a panel and a first planar element pivoted to the panel about an axis parallel to or in the plane of the panel, the first element being shaped and illustrated in accordance with a side view of substantially all of the human body, the body being illustrated in different positions on the two sides of the first element and the panel being pivotable so that either of said sides can contact the panel, and including further elements located adjacent the axis of pivot to be selectively revealed when the first element is pivoted and shaped and illustrated to represent the rest of the body.

A device according to the invention gives the person being taught the possibility of at least in principle practicing, by means of the elements movable relative to the panel, various first aid manipulations. The device can be produced in a variety of sizes according to requirements. The design may be such that the elements can always be made to contact the panel in which case the device can be stored without difficulty. Furthermore, the device of the invention can optionally be made, at very low cost, of paper, cardboard, or a similarly effective material, e.g., a plastics material.

Where the device of the invention is for demonstrating and practicing artifical respiration, for example, it is advantageous for the elements to be arranged parallel to the panel and movable parallel thereto. It may be advantageous to provide a plurality of partially overlapping, planar elements representing individual parts of the body. In a device for teaching artificial respiration these parts may for example be the lower jaw with the tongue and the rest of the head. In this case it is proposed that the planar elements be so interconnected that movement of one element causes movement of another element.

Another possibility according to the invention is to have the elements mounted so as to be at least partially foldable about an axis lying in or parallel to the plane of the panel. This arrangement of the device may be adopted when for instance it is a question of demonstrating the correct positioning of an injured person. In this embodiment the elements may suitably have at either side representations of the body or parts thereof in different positions and projected into different planes.

In order to show in greater detail the relationship of the moved body parts represented by foldable elements, the device may have further elements fixed on the panel to represent other body parts projected into the same plane.

The invention also provides apparatus for use in teaching first aid comprising a plurality of such devices bound in the form of a booklet or book.

Figure 1B:
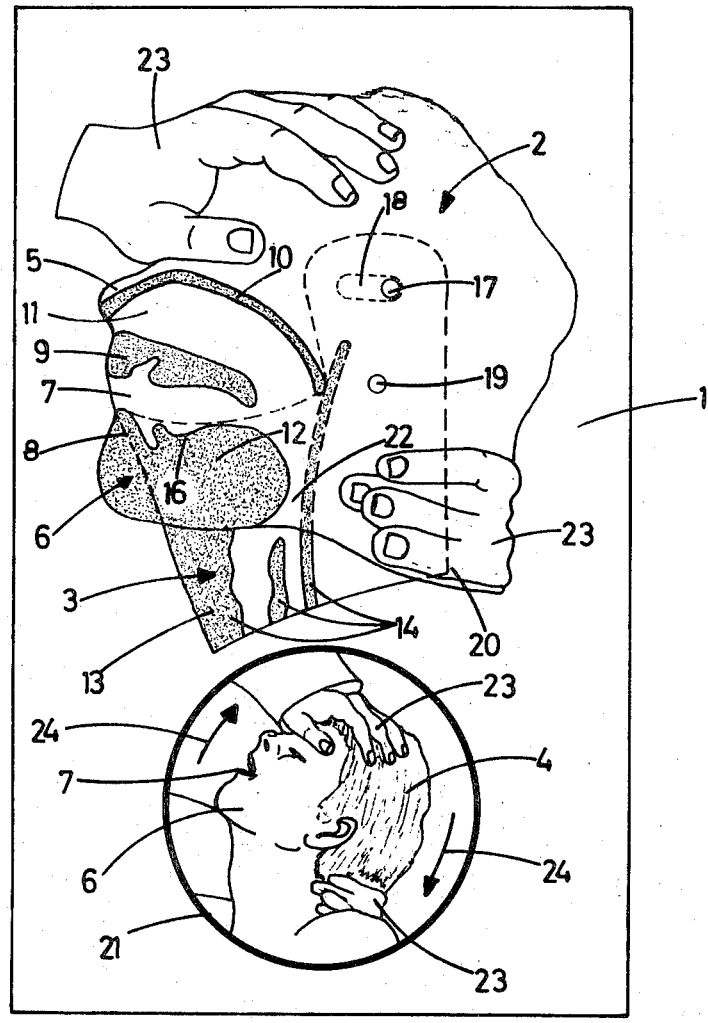
Figure 2A:
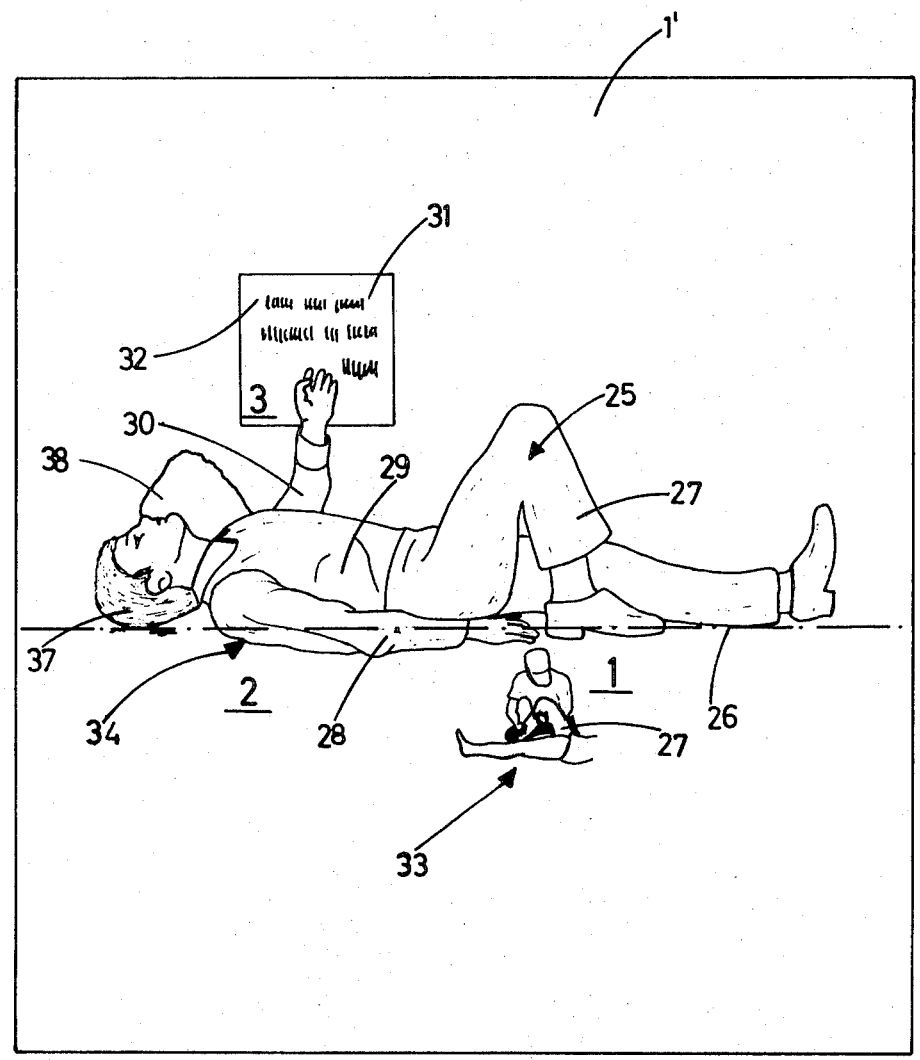
Figure 2C:
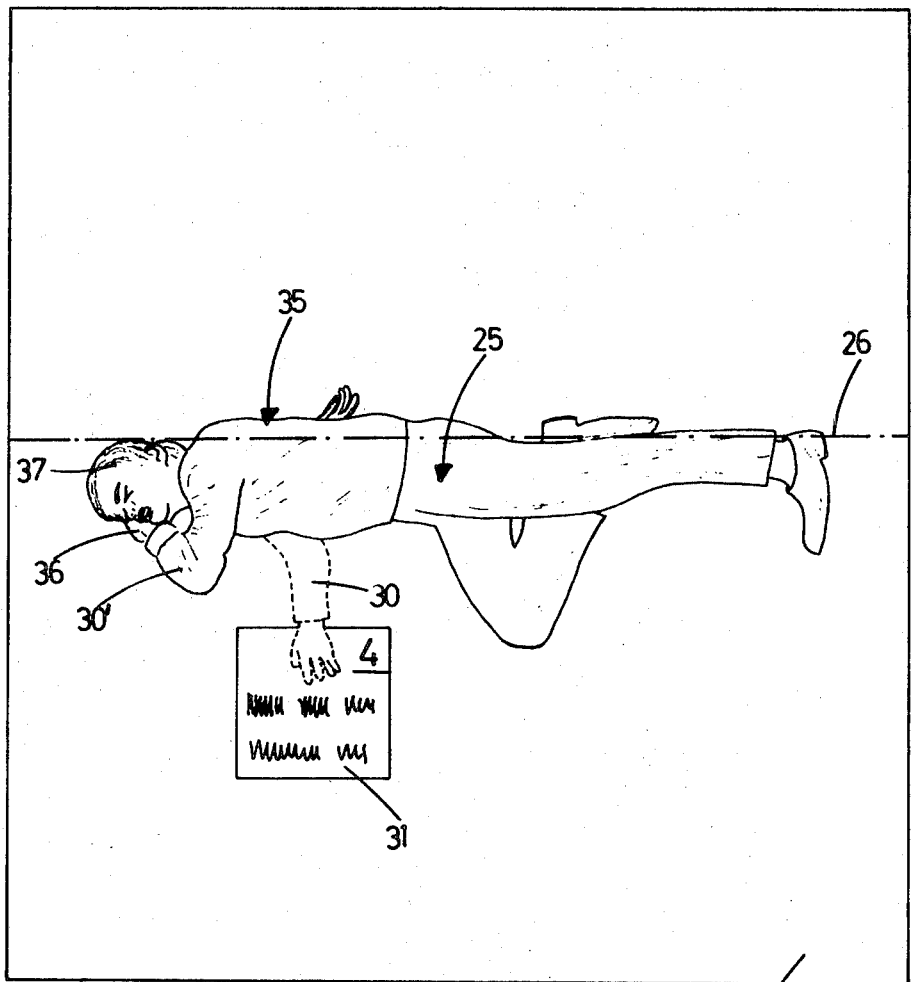

In order that the invention may be more clearly understood, the following description is given, merely by way of example, with reference to the accompanying drawings, in which:

FIGS. 1a and 1b show plan views of a device according to the invention having movable elements representing parts of the head and in two different positions; and FIGS. 2a to 2c show a second device according to the invention wherein a pivotable element representing the body of an injured person is shown in the three different positions.

FIGS. 1a and 1b of the drawing show a device according to the invention which serves to illustrate and represent the manipulations required prior to artificial respiration and the corresponding required attitude of the head. The device has a panel-like support surface 1 which may be a page, for instance of reinforced material, of a book or booklet for teaching various first aid measures.

On one surface of the panel 1 there are disposed two planar elements 2, 3 arranged parallel to the panel 1 and movable parallel thereto. The two planar elements 2, 3 together comprise a representation of a human head 4 projected into its median plane. The element 2 is shaped to represent almost all of the head, and includes a nose 5 and lower jaw 6, the mouth 7, which is shown open in FIG. 1*b*, being defined by darker coloured areas 8 and 9 of the planar element 2, which is otherwise transparent. The nasal cavity 11 is indicated on the element 2 by the area 10. The darker area 8 also represents part of the tongue 12 in FIG. 1*a*.

As shown in FIG. 1*a*, the upper outline of the tongue and mouth, in particular the lower lip, is provided by line 15 on lower element 3, viewed through the upper element.

The planar element 3 is hidden by the element 2, as is indicated by the broken lines, except for the neck portion 13. Element 3 has markings 14 indicating the windpipe and the espophagus as well as a marking 15 the outline of which substantially corresponds in shape to the marking 16 of the element 2 and as mentioned represents the upper outline of the tongue and lower lip.

The element 2 is rotatably mounted on the panel 1, by means of a pin 17 passing through a slot 18 in the element 3. Element 2 also has a pin 19 engaging in a corresponding recess of the element 3 but not passing through to the panel. There is a generally arcuately extending slot in the region 20 in the panel 1 through which extends a section of or projection on the portion 13 of planar element 3 (the section or projection not being shown in the drawing) which serves for additionally mounting the element 3. Thus element 2 is pivoted on the panel and pivoted to element 3 (at 19) while movement of element 3 relative to element 2 is limited by slot 18, and movement of element 3 relative to the panel is also limited. Thus when the element 2 is moved by rotation about the pin 17, the element 3 is simultaneously rotated by the action of pin 19. FIGS. 1*a* and 1*b* show the two elements in their two terminal positions of rotary movement.

A separate illustration of a human head is given within the circle 21 of FIG. 1*a*, and this shows the head in a normal position in which the mouth is closed, with passage 22 leading to the windpipe closed by the tongue 12. This corresponds to the situation represented by the device in this Figure. With the head in this position neither mouth-to-mouth nor a mouth-to-nose artificial respiration would be possible. It may be noted that because of the darker colouring of the region 8' on element 3 below line 15, the borderline 16 is not discernable in FIG. 1*a*, and the tongue and lower lip appear bounded by line 15.

Hands are illustrated at 23, and when pressure is is applied to element 2 as if by these hands the elements will move to the position shown in FIG. 1*b*. In practice this is the pressure one should apply to the head when preparing to give artificial respiration. The direction of correctly applied pressure is as shown in the illustration within the circle in FIG. 1*b* by arrows 24. Thus, the elements move as a human head which they represent would move. In the position of FIG. 1*b*, the lower jaw 6 is moved forward so that the tongue 12 frees the passage 22 and artificial respiration becomes possible. The line 15 representing tongue and lower lip of the element 3 is, in this position, in register with the line 16 of the element 2. Thus the appropriate optical impression of an open mouth is created, the tongue and lower lip now appearing bounded by line 16.

It is easily understood that the above described device allows anybody easily and repeatedly to practice on the device the manipulations necessary in preparing for artificial respiration, and to memorise the correct position of the head.

A second exemplary embodiment is shown in FIGS. 2*a* to 2*c*. This device is useful for teaching the correct positioning of an injured person. A representation of a side view of substantially all of a human body on its back is given on one side of a planar element 25 on a panel 1', which again may be a page of a book. The element 25 can be pivoted about the axis 26 which is in the plane of the panel. On the other side of element 25 is a representation of the same body turned onto its side (see FIG. 2*c*). The rest of the body is shown at 34 and 35 in FIGS. 2*a* and 2*c* respectively. The element can be rotated from a position wherein one of its sides contacts the panel 1' (in FIG. 2*a*) via a position wherein it is substantially perpendicular to the panel 1' (in FIG. 2*b*) to a position wherein it lies with its other side on the panel. FIGS. 2*a* and 2*c* show that on the different surfaces of the element 25 the body is illustrated in different positions. FIG. 2*a* shows the injured body in the conventional dorsal position from which it has to be brought into the stable lateral position. As shown, the leg 27 has already been angled up, which as indicated by the numeral 1, is the first step which should be taken. Also the arm 28 nearest the person rendering first aid is already placed alongside the body 29 in accordance with the second step to be taken (numeral 2). Furthermore, the other arm 30 is raised as in the third step (numeral 3). This arm is normally held upwards by the person rendering first aid so long as the body is on its back. Since this is difficult to illustrate in the drawing, an area 31 is connected with the arm 30 of the element 25, on which area suitable written instructions have been provided. Shown in an insert 33 in FIG. 2*a* is the step of angling the leg 27 in the correct manner, in order to assist the student.

In FIG. 2*a*, the element 25 is in a position in which it contacts the panel 1' in an area substantially above the pivot axis 26. The portions 34 of the representation of the patient which are below the pivot axis 26 are not movable. FIG. 2*b* shows the element 25 in a position in which the patient has been slightly turned although not through 90°, the angle through which element 25 is pivoted. It should be pointed out that when in the position of FIG. 2*b* the device should be viewed from the side, rather from above. Part 34 of FIG. 2*a*, showing in particular part of arm 28, can no longer be seen.

FIG. 2*c* shows the element 25 after 180° rotation about the axis 26, i.e., in the position in which it again contacts the surface of the panel 1' but below the axis 26. This represents a 90° turn of the body from its back onto its side. Portions 35 of the representation of the body which are above the axis 26, can now be seen and are fixed to with the panel 1'. The portions 34, 35 are selectively hidden by element 25, thus in the position of FIG. 2*a* the portion 35 and in the position of FIG. 2*c* the portion 34 are covered by the replica 25.

In FIG. 2*c* the arm 30 as it was shown in FIGS. 2*a* and 2*b* is only illustrated in broken lines. It is shown in solid lines at 30'. This arm should be so placed that the hand 36 extends under the head 37 of the patient. An outline of this arm in position 30' appears also in FIG. 2*a*, but in practice the parts within this outline will be made not to contrast in colour with the panel 1', so as not to be prominent. Similarly the arm shown dotted at 30 in FIG. 2*c* should be of the same colour as panel 1'. Instructions to bring the arm into the position 30' are given at 4 (FIG. 2c) on the reverse side of the area 31, although this is not essential.

It will be realised that with the aid of the device of FIGS. 2a to 2c anybody can relatively quickly learn the steps required for positioning an injured person and optionally repeat and practice them. These steps are folding up leg 27, straightening arm 28 alongside the body raising arm 30, rolling the body onto its side and bending arm 30 to position 30'.

The panels 1 and 1' may be parts of a book or booklet which although not shown may be provided with a pocket. The pocket may be used to receive diverse articles, e.g., motor car documents or important telephone numbers. However, it will be particularly useful for keeping first aid instructions in, for instance tabular form, giving the various steps in rending first aid in correct sequence. The representations of these steps can be arranged in the same order on devices such as those described above and other devices employing the same principles to illustrate other first aid steps.

I claim:

1. A device for teaching artificial respiration, comprising: a panel, and first and second planar elements only, said first planar element being pivotably mounted on said panel so as to be movable parallel to the panel and representing the side view of a human head with an upper lip but without a lower lip and having marked thereon a tongue, and said second planar element being pivotable with respect to said first planar element and representing the side view of a neck and the lower lip of a human head and having marked thereon a windpipe, one of said elements at least partly overlying the other and being at least in part transparent and having darkened areas, said two elements being interconnected and pivotable between a first position in which the lips appear closed and the windpipe blocked by the tongue and a second position in which the lips and windpipe appear open.

2. A device according to claim 1, wherein said first planar element has darkened areas outlining a mouth.

* * * * *